(12) United States Patent
Emma et al.

(10) Patent No.: US 7,945,765 B2
(45) Date of Patent: May 17, 2011

(54) METHOD AND STRUCTURE FOR ASYNCHRONOUS SKIP-AHEAD IN SYNCHRONOUS PIPELINES

(75) Inventors: Philip George Emma, Danbury, CT (US); Allan Mark Hartstein, Chappaqua, NY (US); Hans Jacobson, White Plains, NY (US); William Robert Reohr, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/023,495

(22) Filed: Jan. 31, 2008

(65) Prior Publication Data

US 2009/0198970 A1    Aug. 6, 2009

(51) Int. Cl.
    *G06F 9/38* (2006.01)
(52) U.S. Cl. ......................................... 712/219
(58) Field of Classification Search .................. None
    See application file for complete search history.

(56) References Cited

U.S. PATENT DOCUMENTS

| | | | | | |
|---|---|---|---|---|---|
| 5,099,421 | A | * | 3/1992 | Buerkle et al. | 712/216 |
| 5,262,973 | A | * | 11/1993 | Richardson | 708/525 |
| 5,471,626 | A | * | 11/1995 | Carnevale et al. | 712/219 |
| 5,511,015 | A | * | 4/1996 | Flockencier | 708/420 |
| 5,649,174 | A | * | 7/1997 | Dockser | 713/501 |
| 5,748,516 | A | * | 5/1998 | Goddard et al. | 708/497 |
| 5,764,551 | A | * | 6/1998 | McCorkle | 708/300 |
| 5,802,331 | A | * | 9/1998 | Van Berkel | 712/1 |
| 5,917,737 | A | * | 6/1999 | Tsui et al. | 708/403 |
| 5,930,492 | A | * | 7/1999 | Lynch | 712/216 |
| 6,173,303 | B1 | * | 1/2001 | Avigdor et al. | 708/620 |
| 2003/0037226 | A1 | * | 2/2003 | Tsuruta et al. | 712/228 |
| 2003/0226000 | A1 | * | 12/2003 | Rhoades | 712/218 |
| 2005/0251699 | A1 | * | 11/2005 | Jacobson | 713/400 |
| 2005/0273481 | A1 | * | 12/2005 | Dent | 708/277 |
| 2009/0070602 | A1 | * | 3/2009 | Ingle et al. | 713/300 |
| 2009/0138674 | A1 | * | 5/2009 | Chang et al. | 712/23 |
| 2009/0292907 | A1 | * | 11/2009 | Schwinn et al. | 712/229 |
| 2010/0106947 | A1 | * | 4/2010 | Moloney | 712/221 |
| 2010/0217961 | A1 | * | 8/2010 | Hosoda | 712/234 |

OTHER PUBLICATIONS

Lee et al. (Asynchronous ARM Processor Employing an Adaptive Pipeline Architecture). ARC 2007, LNCS 4419, pp. 39-48, 2007; ARC 2007 held on Mar. 27-29, 2007.*
Efthymiou et al. (Adaptive Pipeline Structures for Speculation Control); Proceedings of the 9th International Symposium on Asynchronous Circuits and Systems; Year of Publication: 2003; 10 pages.*
Jacobson et al. (Synchronous Interlocked Pipelines); Proceedings of the 8th International Symposium on Asynchronus Circuits and Systems; Year of Publication: 2002; 10 pages.*
Efthymiou et al. (Adaptive Pipeline Depth for Asynchronous Systems Using Collapsible Latch Controllers); 13th Asynchronous UK forum, Cambridge, Dec. 2002; 4 pages.*

(Continued)

*Primary Examiner* — Eddie P Chan
*Assistant Examiner* — Keith Vicary
(74) *Attorney, Agent, or Firm* — McGinn IP Law Group, PLLC

(57) ABSTRACT

An electronic apparatus includes a plurality of stages serially interconnected as a pipeline to perform sequential processings on input operands. A shortening circuit associated with at least one stage of the pipeline recognizes when one or more of input operands for the stage has been predetermined as appropriate for shortening and execute the shortening when appropriate.

18 Claims, 13 Drawing Sheets

OTHER PUBLICATIONS

Jacobson (Improved Clock-Gating through Transparent Pipelining); Proceedings of the 2004 international symposium on Low power electronics and design; pp. 26-31; Year of Publication: 2004.*

Islam et al. (Early detection and bypassing of trivial operations to improve energy efficiency of processors); Microprocessors and Microsystems, vol. 32, Issue 4, Jun. 2008, pp. 183-196; Available online Nov. 1, 2007.*

Islam et al. (Reduction of Energy Consumption in Processors by Early Detection and Bypassing of Trivial Operations); This paper appears in: Embedded Computer Systems: Architectures, Modeling and Simulation, 2006. IC-SAMOS 2006. International Conference on; Issue Date: Jul. 2006; On pp. 28-34.*

Yi et al. (Improving Processor Performance by Simplifying and Bypassing Trivial Computations); This paper appears in: Computer Design: VLSI in Computers and Processors, 2002. Proceedings. 2002 IEEE International Conference on Issue Date: 2002, On pp. 462-465; 4 total pages.*

Atoofian et al. (Improving Energy-Efficiency by Bypassing Trivial Computations); IPDPS '05 Proceedings of the 19th IEEE International Parallel and Distributed Processing Symposium (IPDPS'05)—Workshop 11—vol. 12; 7 pages.*

Richardson (Exploiting Trivial and Redundant Computation); This paper appears in: Computer Arithmetic, 1993. Proceedings., 11th Symposium on; On pp. 220-227 ; Issue Date: Jun. 29-Jul. 2, 1993.*

* cited by examiner

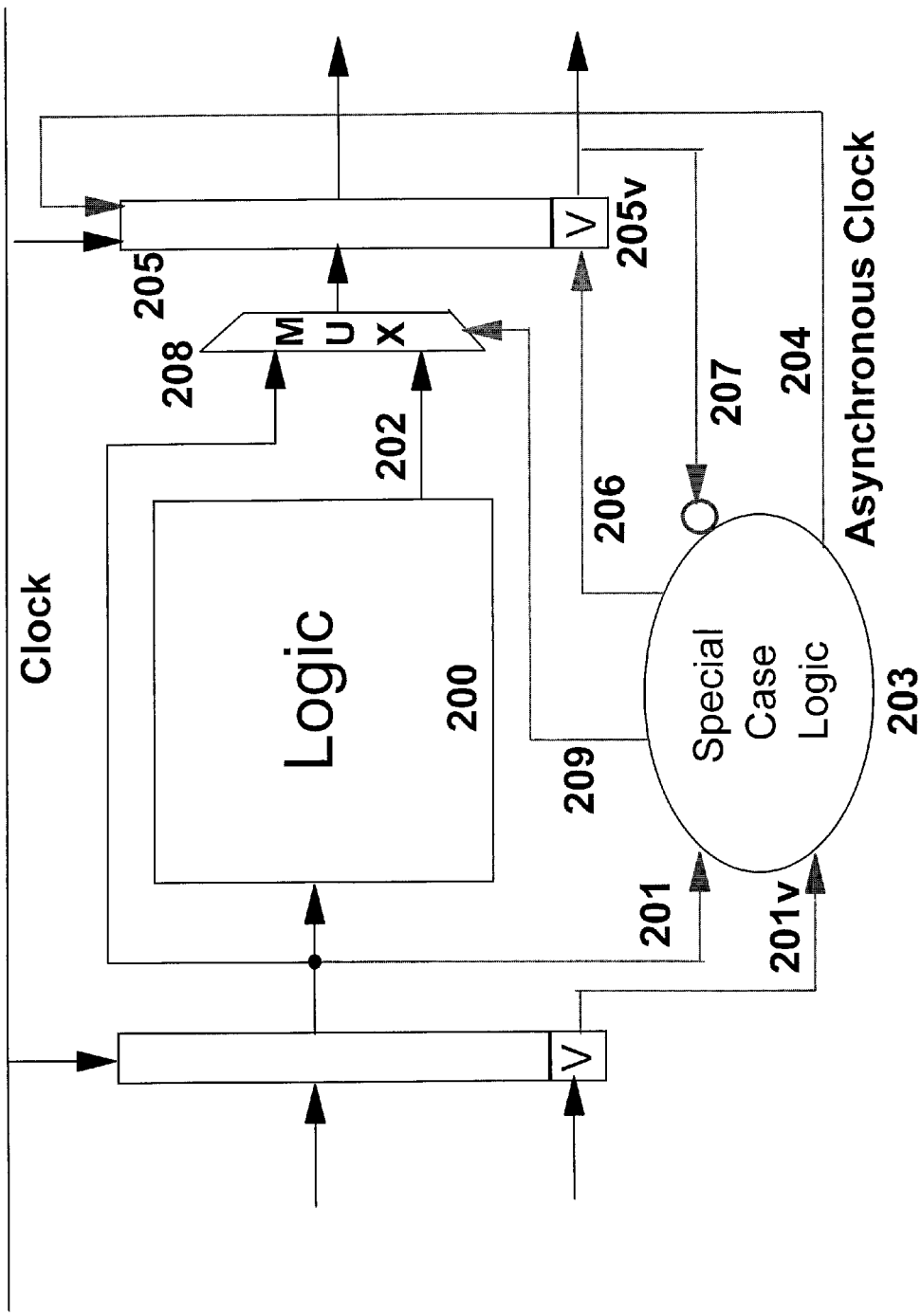

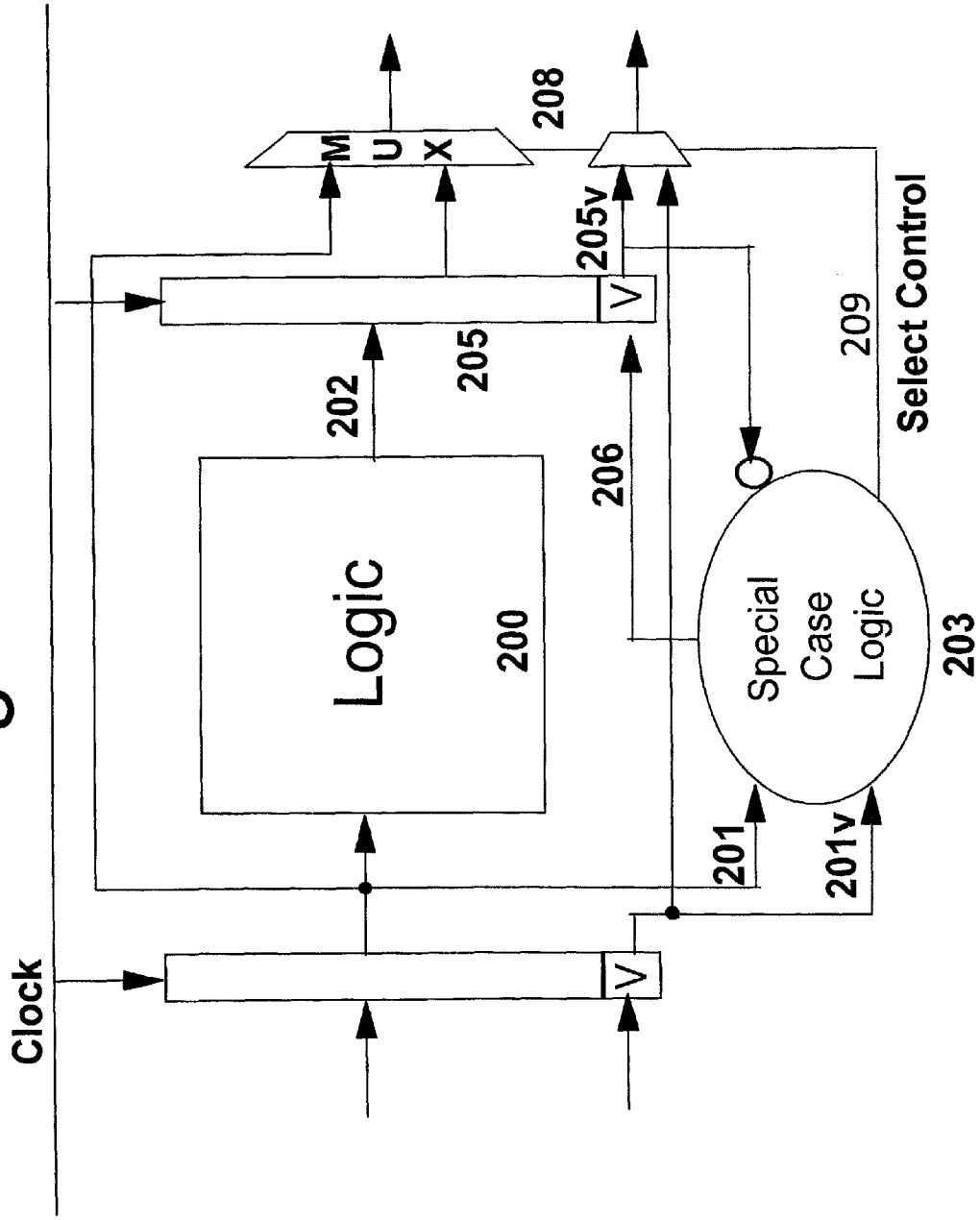

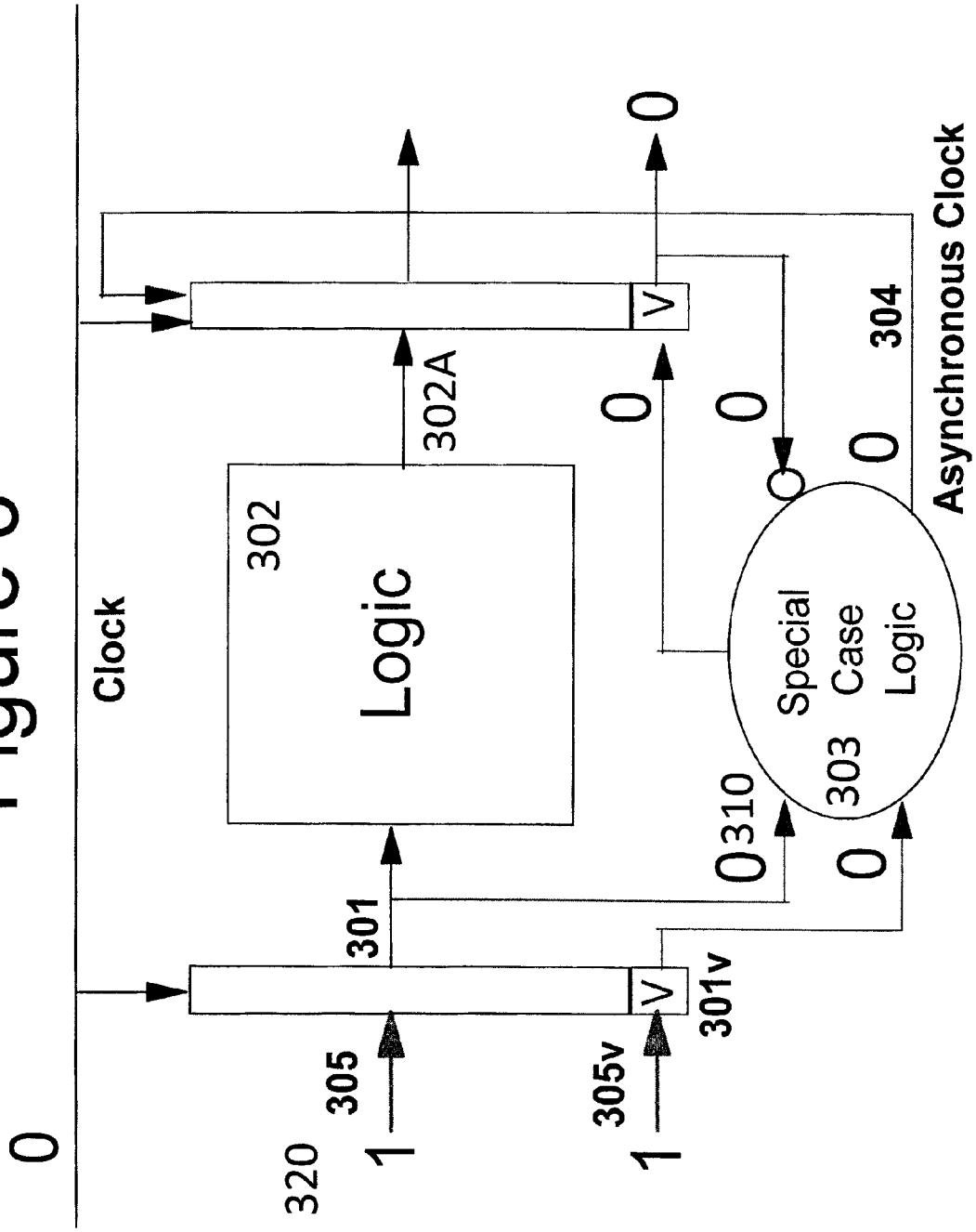

METHOD AND STRUCTURE FOR ASYNCHRONOUS SKIP-AHEAD IN SYNCHRONOUS PIPELINES

BACKGROUND OF THE INVENTION

1. Field of the Invention

The present invention generally relates to general high-performance operation within computer pipelines. More specifically, a structure and method dynamically shortens a pipeline under predetermined circumstances, thereby providing shorter latency for those circumstances and overall improvement in processor performance.

2. Description of the Related Art

In the earliest electronic computers (e.g., in the era of von Neumann), the processor would do one instruction, from start to finish, at a time. The very first "parallelism" technique that evolved in the next era was that of "pipelining."

The processing of an instruction requires several steps. In general, these steps are the same steps for many different instructions, and the hardware that implements those steps is built to perform those steps the same way, regardless of the values of the data being operated on. In pipelining, the various steps are implemented "piecemeal," exactly the way that an assembly-line works.

Each step is performed by a unique piece of logic circuitry, and the sequential steps are implemented by connecting those pieces of logic circuitry (called "pipeline segments") together in sequence, and "insulating" those pipeline segments from each other by putting staging-latches between them. The computer pipeline is then a Finite-State Machine (FSM): the processor clock captures data in the staging-latches as the "state" of the processor on any cycle.

In a sequence of clock cycles, a given instruction will enter the pipeline, and will be processed piecemeal in each sequential pipeline stage as the clock ticks. The way that this improves performance (over the era of von Neumann) is that a new instruction can be started on every cycle. The "state" of the FSM on any cycle then contains the partial results of many (sequential) instructions that are in various stages of processing as the pipeline flow progresses.

The overall latency through the pipeline is longer than the latency of the von Neumann era, since staging latches have been added between the logical components of the machine, but the instruction issue rate can be much higher, since there is no need to wait for the completion of each instruction to issue the next instruction.

In pipelining the flow for any instruction is generally the same as that for any other (similar) instruction, and all data being operated on (called "operands" herein) are operated on in the same way by the same circuitry. While this makes the processor's behavior very predictable, and (arguably) "simple" to design, it is frequently the case that unnecessary work is done by the pipeline. This is precisely because all operands are treated the same.

SUMMARY OF THE INVENTION

In view of the foregoing problems, drawbacks, and disadvantages of the conventional systems, it is an exemplary feature of the present invention to provide a structure (and method) in which predetermined cycles of processing can be eliminated from a pipeline in those special cases where the operand data is such that those cycles are to the computation.

It is another exemplary feature of the present invention to provide a method for dynamically shortening a pipeline under some predetermined circumstances, thereby providing shorter latency some of the time and improving processor performance.

In a first exemplary aspect, described herein is an electronic apparatus including a plurality of stages serially interconnected as a pipeline to perform sequential processings on input operands and a shortening circuit associated with at least one stage of the pipeline to recognize one or more of input operands for the stage for which shortening has been predetermined as appropriate and to execute the shortening when appropriate.

In a second exemplary aspect, also described herein is a method of shortening a pipeline processing, including receiving an input operand, recognizing whether the input operand comprises an input operand predetermined to be subject to shortening, and executing the shortening when appropriate.

In a third exemplary aspect, also described herein is a pipeline processing shortening circuit associated with a stage of a pipeline having a plurality of stages serially interconnected to perform sequential processings on input operands, the shortening circuit including a receiver for receiving an input operand for the stage, a comparator for recognizing whether said input operand comprises an input operand predetermined to be subject to shortening, and a controller for executing the shortening when recognized as appropriate.

BRIEF DESCRIPTION OF THE DRAWINGS

The foregoing and other objects, aspects and advantages will be better understood from the following detailed description of a preferred embodiment of the invention with reference to the drawings, in which:

FIG. 2a shows the further detail of a data selector used to bypass the logic as is implicitly understood to exist in FIG. 2;

FIG. 2b shows a logically equivalent method of bypassing data in which the output latch is bypassed entirely;

FIG. 3 shows the new pipeline segment in a quiesced state with new operand data arriving at its inputs;

DETAILED DESCRIPTION OF EXEMPLARY EMBODIMENTS OF THE INVENTION

Figure 1:
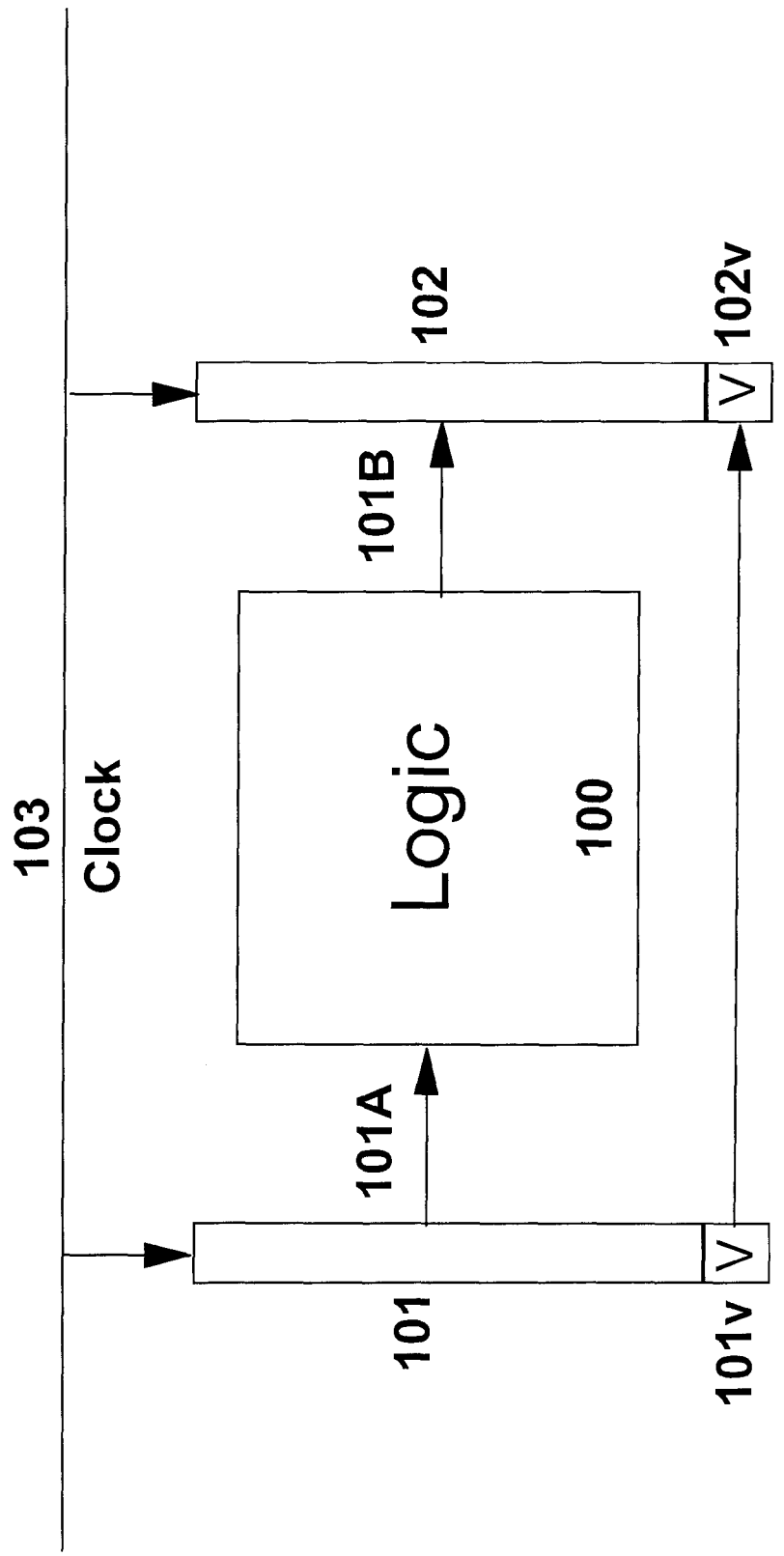
FIG. 1 shows a generic pipeline segment with input and output latches, and a clock that drives these latches as per prior art.

Referring now to the drawings, and more particularly to FIGS. 1-11, there are shown exemplary embodiments of the method and structures according to the present invention.

As mentioned, the present inventors have recognized that, in many cases, certain values of operands make some pipelined steps unnecessary for some of the instructions. When such operands can be recognized, the present invention teachs a method and apparatus for eliminating (bypassing) those steps, thereby saving cycles within the pipeline and speeding up the computation. Some trivial (although not infrequent) examples of this are multiplication or division by "1" (or for that matter, by any power of 2), multiplication or addition with the value "0," incrementing, and many other cases. In these cases, most of the logic circuitry required to do general multiplication or addition is unnecessary.

It is noted that saving cycles within the pipeline might include either bypassing the current stage by passing the input directly to the subsequent stage or conjoining the processing of the input of the current stage with processing in the subsequent stage during the same system clock cycle. Either of these two mechanisms will shorten the pipeline processing.

Thus, the present invention teaches to recognize those cases where cycles can be eliminated, and to eliminate them.

A general pipeline is designed so that each pipeline segment will operate with correct timing for any set of inputs. Therefore, the pipeline must be timed assuming the worst-case set of inputs, and the flow of the pipeline is forever limited by this worst-case. For some kinds of pipelines, there can be a subset of possible inputs that have much faster timing through the pipeline than worst case. For example, an arithmetic pipeline can be very fast if the known operation is to multiply by 0, 1, or 2, or to add aligned single-digit numbers. The state of the art does not take advantage of these situations, but instead runs every set of inputs as if they were the worst case.

In an exemplary embodiment, additional logic circuitry recognizes those input operands for which the other logic within the stage is not required, and to bypass the relevant portions of the input operands directly to the following pipeline stage by making the output staging latches temporarily transparent (i.e., by asynchronously opening them very briefly).

Thus, in summary, the present invention provides a method and means for shortening the pipeline by eliminating one or more capturing events by making certain latches transparent whenever inputs that are predetermined to enable a faster timing are recognized. The present invention does not change the clocking rate. Rather, it eliminates some of the intermediate latching some of the time. This allows the fast data to "spurt" further ahead into the pipeline by one or more cycles.

The concept is exemplarily demonstrated in the figures. FIG. 1 shows an abstracted pipeline segment 10. The stage 10 comprises the combinational logic circuitry 100 that operates on the input operand(s) 101A to produce an output operand (or operands) 101B. The input operand(s) 101A is (are) sourced by the input staging latch 101 that feeds the combinational logic 100. The output operand(s) 101B is (are) captured by the output staging latch 102 that feeds the next segment in the pipeline (not shown).

Input operands 101A can be a single bit or a plurality of bits, such as a byte or plurality of bytes, and includes valid bit 101v that indicates validity of the operand 101A. Operand 101A might also include portions of data or instruction code that is effective for stages other than the current stage 10. Therefore, with this general statement, the term "operand" in the following discussion will carry an implication that a plurality of operands might be included. Typically, the operands are transported through the various pipeline stages 10 via a bus that interconnects the pipeline stages 10.

Clock signal 103 drives the staging latches 101, 102 and causes the new input operand 101A to be captured in latch 101 from the preceding pipeline segment (not shown) at the beginning of each cycle. Simultaneously, clock signal 103 also causes the output that was just computed by this segment to be captured in a latch 102 for use by the next pipeline segment (not shown).

Without loss of generality, each latch is shown as having a "Valid" bit (101v and 102v). This bit indicates that the contents of its corresponding latch (101 for 101v, and 102 for 102v) are actual operands that should be processed by the logic circuit of the appropriate pipeline stage. Thus, the valid bit indicates that the latches are not "empty" or have a state that does not pertain to any instruction.

Figure 2:
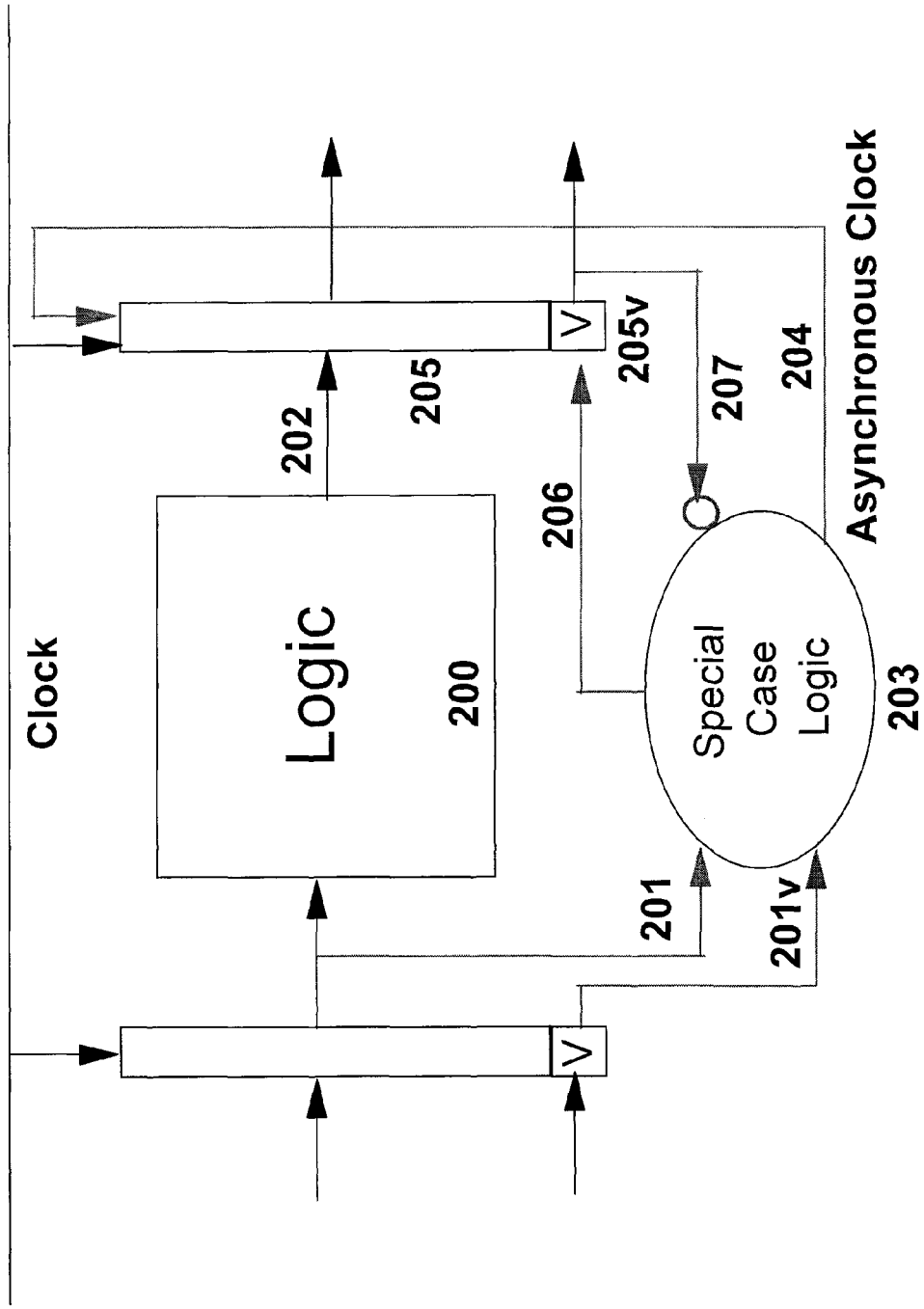
FIG. 2 shows this same pipeline segment augmented with some new logic that can open the output latch asynchronously in accordance with this invention.

FIG. 2 shows an exemplary embodiment of the present invention, wherein new logic and signals are added to the stage 10 shown in FIG. 1. In this embodiment, a "Special Case Logic" (SCL) 203 is added. The purpose of this logic is to examine the input operand 201 together with the corresponding "Valid" bit 201v. If this is a real operand (e.g., as indicated by the "Valid" bit 201v), the new logic 203 determines whether the input operand(s) 201 is one of the "special cases" that allows this pipeline segment to be bypassed.

As drawn here (and without loss of generality), it is assumed that if the operand(s) 201 is one of these special cases, the canonical logic within the segment 200 will simply pass the operand(s) through 202 without doing any transformations on it. It is noted that, if this is not the case, these bypasses can be put in with a simple multiplexor, as would be standard practice by anyone skilled in the art.

FIG. 2a is included to show this explicitly. A new multiplexor element, MUX 208 is shown explicitly. The MUX 208 chooses either the input or the output of the Logic 200 as input to the latch 205. The Special Case Logic 203 provides a selection control signal 209 to make the choice. How to implement this would be well understood by anyone with ordinary skill in the art, so for the sake of not confusing the essential elements of this invention, this will not be shown explicitly in the remaining drawings.

It is also mentioned that in an alternative embodiment, the new multiplexor element 208 could be placed after the latch 205, as shown in FIG. 2b. In this way, the input 201 to the Logic 200 bypasses the latch 205 entirely. If embodied in this way, the Special Case Logic 203 would not generate clocking signals to manipulate the latch 205, because the latch becomes irrelevant (other than that its Valid bit 205v must be set appropriately). Instead, the Special Case Logic 203 generates a Select Control signal 209 which is logically equivalent, although it is static (i.e., not a transient "pulse").

Again, how to implement the logic required in FIG. 2b would be well understood by anyone with ordinary skill in the art. It should be understood that FIG. 2b is logically equivalent to FIG. 2a. Arbitrarily, the remainder of the embodiment will assume the implementation of FIG. 2a, but FIG. 2b and the set of analogous figures that would flow from that (as FIGS. 3, 4, and so on) are understood to be covered by the scope of this invention. It is also noted that the verification issues of choosing FIG. 2b instead of FIG. 2a would be very different.

Returning to FIG. 2, the new "Special Case Logic" 203 has an (asynchronous) output signal 204 that allows it to temporarily open the output latch 205 and also has a "Valid" output 206 that it uses to write the state of the "Valid" bit in the output staging latch 205v. The term "asynchronous" in this context means that the event is not controlled by the clock signal providing overall control of the pipeline. The "Special Case Logic" 203 also uses the "Valid" bit in the output staging latch 205v (e,g, over wire 207) to help in the implementation of the asynchronous transparency of the output staging latch 205 as will become clear shortly. Note that this "Valid" signal 207 goes to an inverted input (denoted by the circle) on the "Special Case Logic" 203.

It can be seen that the valid bit does not pass directly through (from latch to latch), but instead is routed through the SCL where it is handled slightly differently as will be described.

The inputs to the SCL are: 1) the raw input data to the pipeline stage logic—or a subset thereof (which will be examined to determine whether this particular data is amenable to the high-speed flow being facilitated by this invention); 2) the valid bit associated with the input data (which indicates that there is an operation to be performed); and 3) the valid bit from the output register of the current stage. This last input is needed because the output register cannot be made transparent (thereby concatenating the logic of the current stage with that of the next stage) if there is valid input to be processed within the next stage on this cycle. That is, we cannot do pipeline shortening if there is another task directly downstream of the current stage.

The outputs of the SCL are: 1) a control signal that is used to open up the output latch (to make it transparent or not); and 2) the valid bit that feeds the output latch so as to reflect the appropriate state of that latch if the shortening method is (or is not) done.

FIG. 3 shows FIG. 2 as being in a state that the new logic signals 310 are all shown with 0's (zeros), in order to indicate a "starting state" from which the flow of the following sequence of figures can be better understood. The 0's denote that the stage and all signals start empty.

That is, in FIG. 3, the 0's shown as inputs 310 to the special case logic 303 denote that the contents of the input staging latch 301 are not valid (as indicated by the "Valid" bit 301v), in the sense of the present invention, that the outputs 302A of the logic 302 are irrelevant to any computation, and that the Special Case Logic 303 is not attempting to manipulate the output staging latch with its asynchronous clock signal 304. Thus, the zeroes shown in FIG. 3 are relative to the concepts of the present invention and indicate that the input operand is not a special case exception, and these zeroes do not signify that the input operand actually consists of binary zeroes.

Note that the clock signal is also shown as having a "0." This means that the clock has not arrived, and that all latches are closed.

FIG. 3 also shows that some new valid inputs 320 will be latched in on the next clock cycle. This is indicated by the "Valid" bit input 305v having a "1" on it. Placing a "1" on the operand line itself 305, indicates (just for the sake of this exposition) that this particular operand is one for which this pipeline stage can be skipped, if it is possible to do so. That is, skipping will not occur in a pipeline stage if the pipeline segment following this one will be busy operating on its own valid input data.

Thus, the time sequence starts with FIG. 3. In this figure, nothing is active in this stage, and all the internal control lines are non-active for the shortening. The clock is off. At the inputs to the input register, there is valid data (the V input is "one"), and that input data will be recognized by the Special Case Logic as subject to pipeline shortening. The output latch does not contain anything of use (the valid bit output is "zero").

Figure 4:
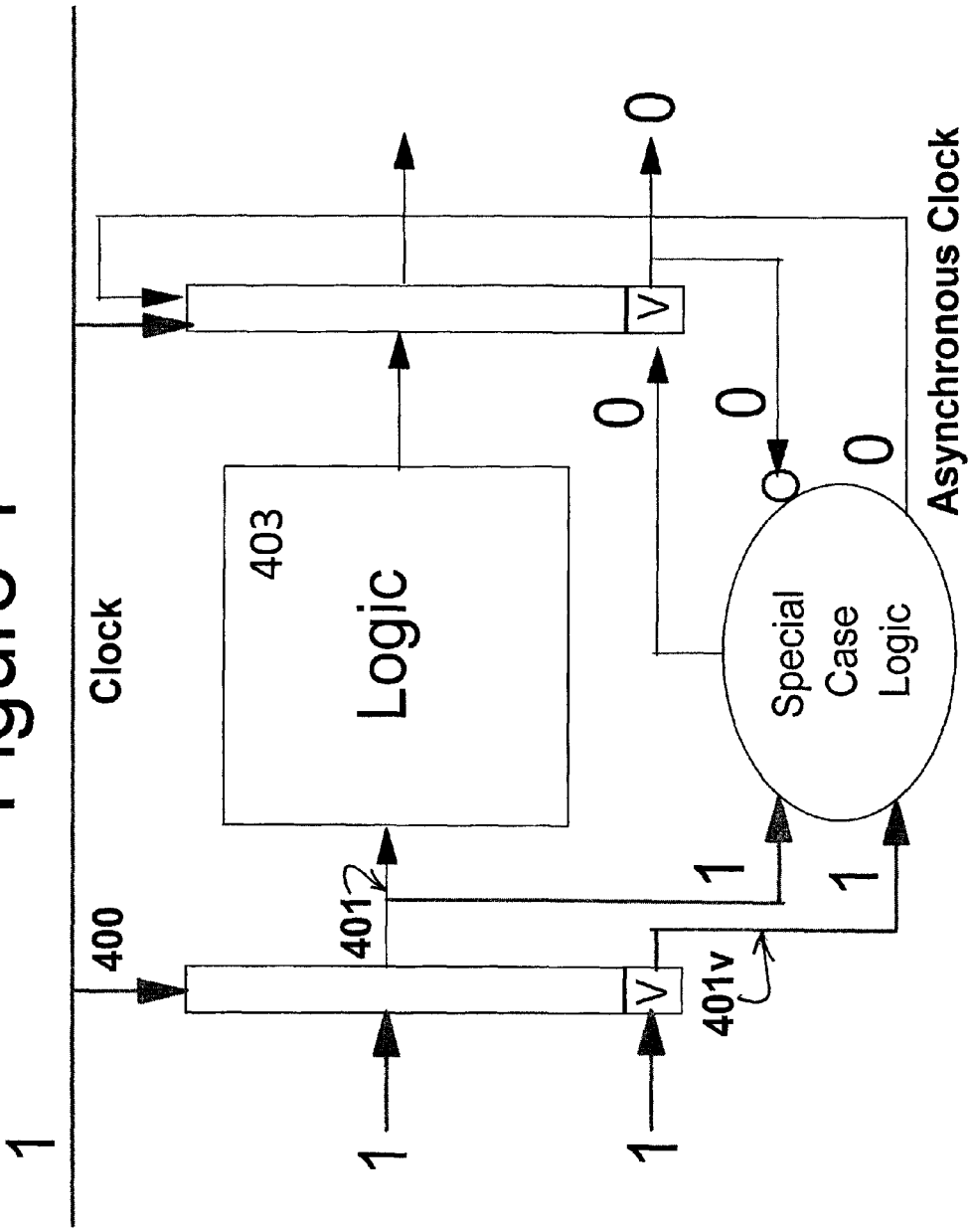
FIG. 4 shows the new operand data being captured in the input latch of the pipeline segment.

In FIG. 4, when the next clock signal comes, as indicated by the "1" on clock signal 400, the new operand and the "Valid" bit are captured in the input staging latch, and are presented to the logic 403 within the pipeline stage on lines 401 and 401v, respectively. Thus, in FIG. 4, the clock gates the input data and its valid bit into the input latch. The SLC inputs now show that there is valid input data that is subject to pipeline shortening. The output latch does not contain anything useful (its valid bit is "zero", indicating that the following stage will not be disrupted by shortening), so it will perform the shortening operation.

Figure 5:
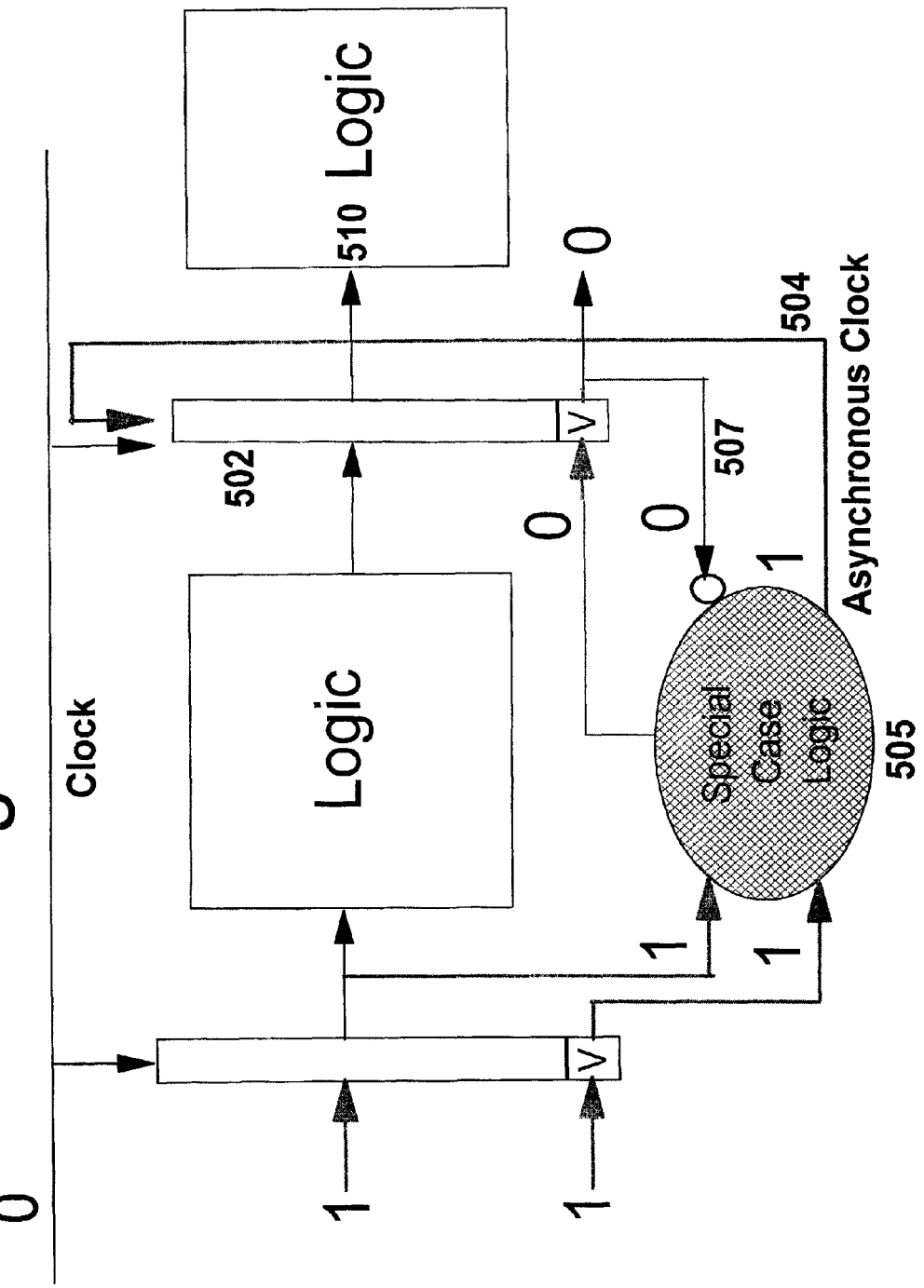
FIG. 5 shows the new logic within the pipeline segment determining that this segment can be skipped for this data, and opening the output latch with an asynchronous clock.

FIG. 5 shows what happens when the Special Case Logic 505 determines that the input operand is one of the operands for which this pipeline stage can be eliminated. Thus, as previously explained, the "1" on the operand line denotes—only for the purpose of this exposition—that this data can be bypassed. Detection of which operands could be shortened could be achieved by comparing the input operand with a plurality of operands predetermined as appropriate for shortening.

The recognition by the SCL that shortening is appropriate for this input operand is denoted in FIG. 5 by filling in the Special Case Logic 505, thereby "lighting it up," and putting a "1" on its asynchronous clock output signal [505]504. The asynchronous clock signal 505 opens up the output staging latch 502 briefly, as will be explained in the following figures, so that the input operand can flow through to the logic of the following pipeline stage 510.

Note that this operation will only happen if the following stage had been idle. This is known by the "0" on the inverted "Valid" input 507 to the Special Case Logic. Had the next stage been computing something relevant, this "Valid" bit 507 would have been a "1," and the Special Case Logic 505 would not attempt to "skip" the operand through the output staging latch 502.

Thus, in FIG. 5, the SCL recognizes these auspicious conditions, and raises the control line that makes the output latch transparent. For those operands in which shortening involves the processing of the current stage and the following stage in the same system clock interval (e.g., rather than simply by-passing the operand to the following stage without processing in the current stage), the logic of the current stage is now conjoined to the logic of the following stage. It has already been designed that the entire dataflow across the two stages will complete within the current cycle. The SCL must allow this to happen, and then reset the states of the latches as we will see.

Figure 6:
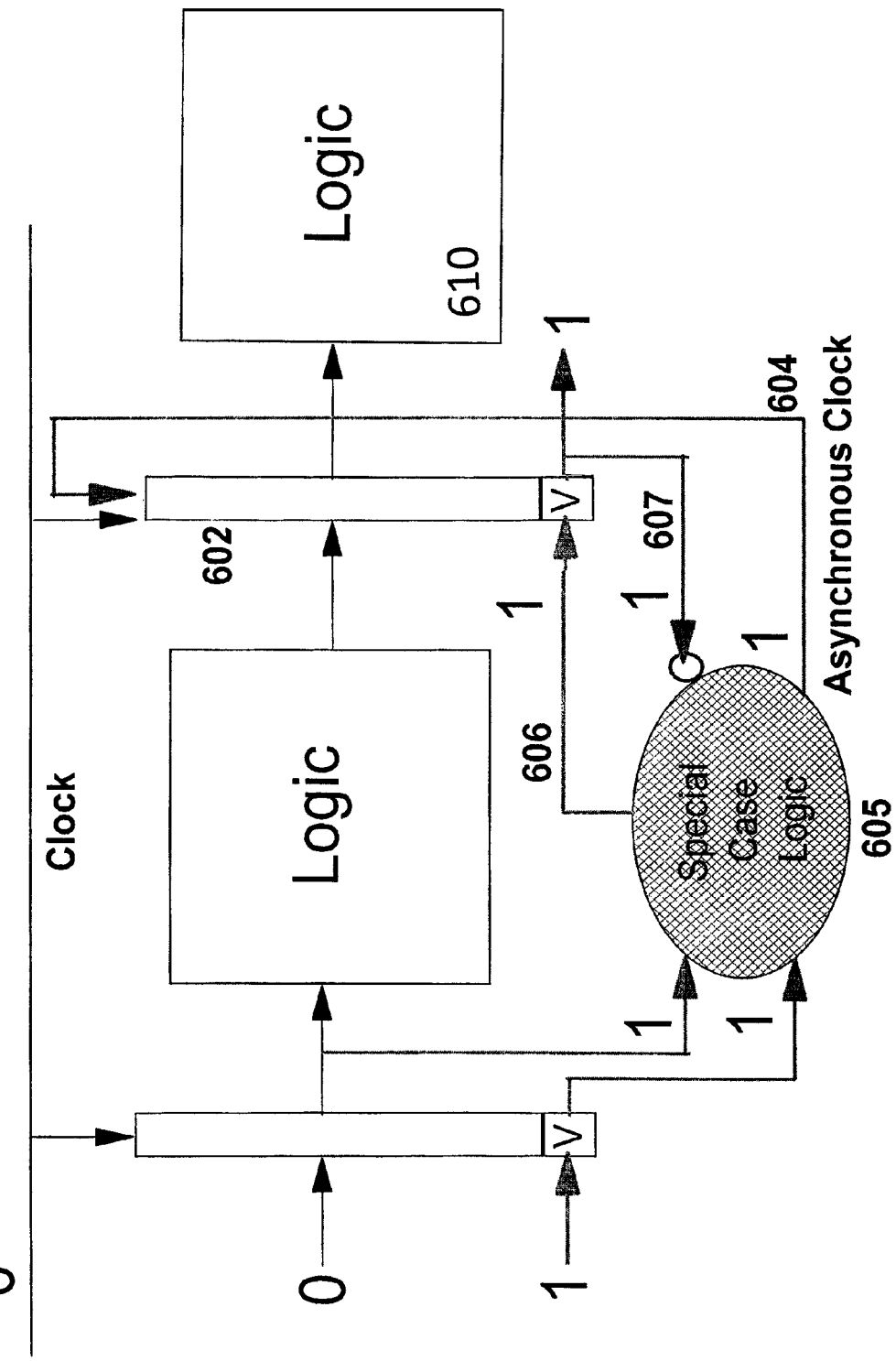
FIG. 6 shows the flow of the Valid bits through the output latch and back into the logic that operates the asynchronous clock.

FIG. 6 shows the pipeline stage a short time after the asynchronous clock signal 604 has opened the output staging latch 602. After the latch 602 has been opened, the Special Case Logic 605 also raises the output valid signal 606 so that the logic in the following pipeline stage 610 will "know" that it has valid operand data on which to operate. This "Valid" signal will feed back to an inverted input of the Special Case Logic on signal 607.

Thus, in FIG. 6, some time after FIG. 5, when it is known that the signal flow is nearly through this stage's logic block when it has been conjoined with the logic block of the following stage, the SCL raises the output valid signal. This signal flows through the transparent latch, back to the input of the SCL.

Figure 7:
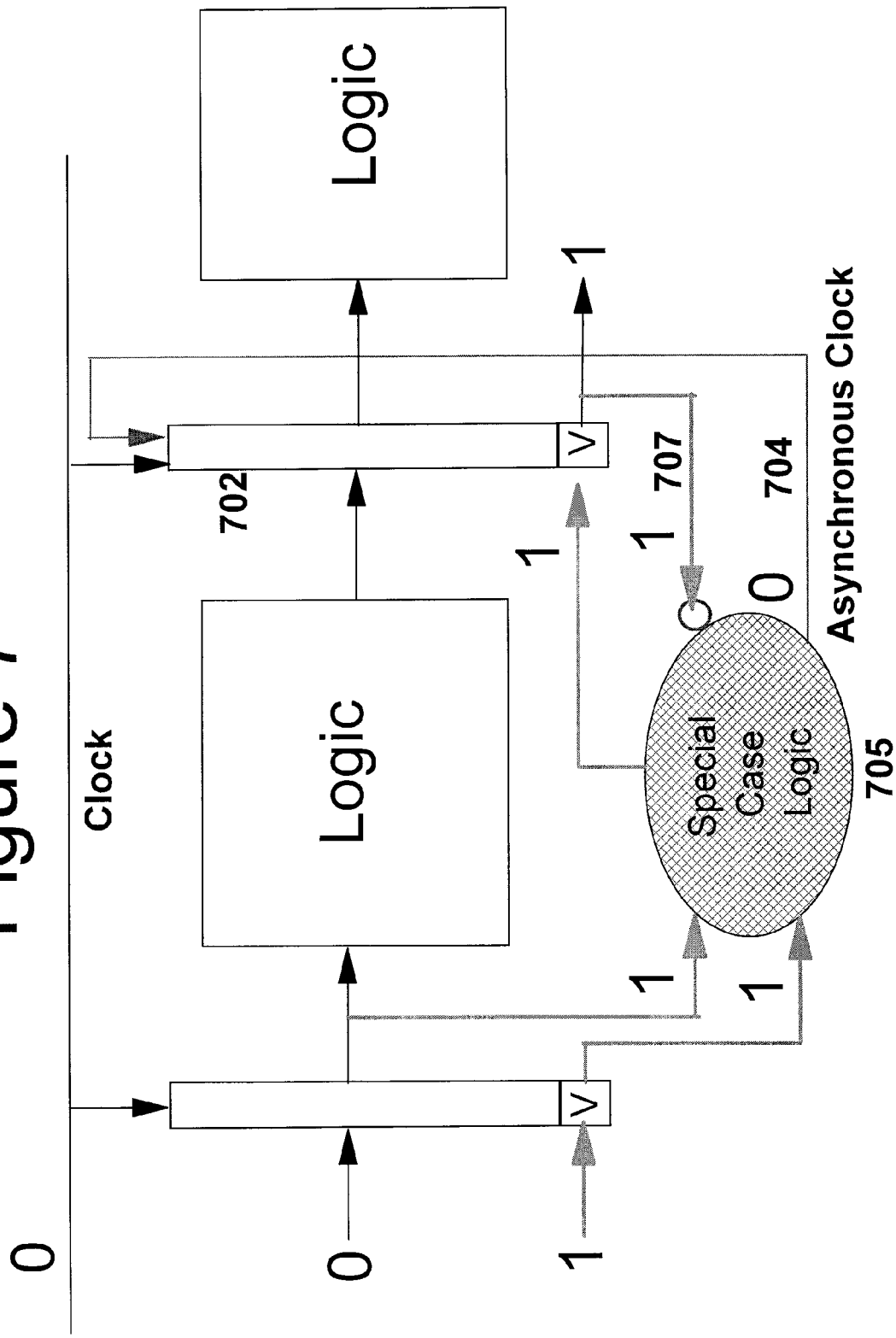
FIG. 7 shows the new logic dropping the asynchronous clock to close the output latch.

In FIG. 7, after the Special Case Logic 705 "sees" that the "Valid" signal 707 has fed through the output latch 702 and returned to the Special Case Logic 705, it will drop the asynchronous clock signal 704, thereby closing the output staging latch 702.

The net effect of the flow through these past figures is that the original input operand and its Valid bit have been passed through the current pipeline stage, and are latched up as valid inputs to the next stage, which is currently processing it.

Essentially, the pipeline has skipped this particular pipeline segment for this particular operand data.

In FIG. 7, for those operands involving conjoining of the current and following stage logic blocks, after the SCL sees the valid signal from the output latch drop, it lowers the control line output, which causes the output latch to become nontransparent once again. The timing must ensure that all data must have flowed through the first stage by this time.

Figure 8:
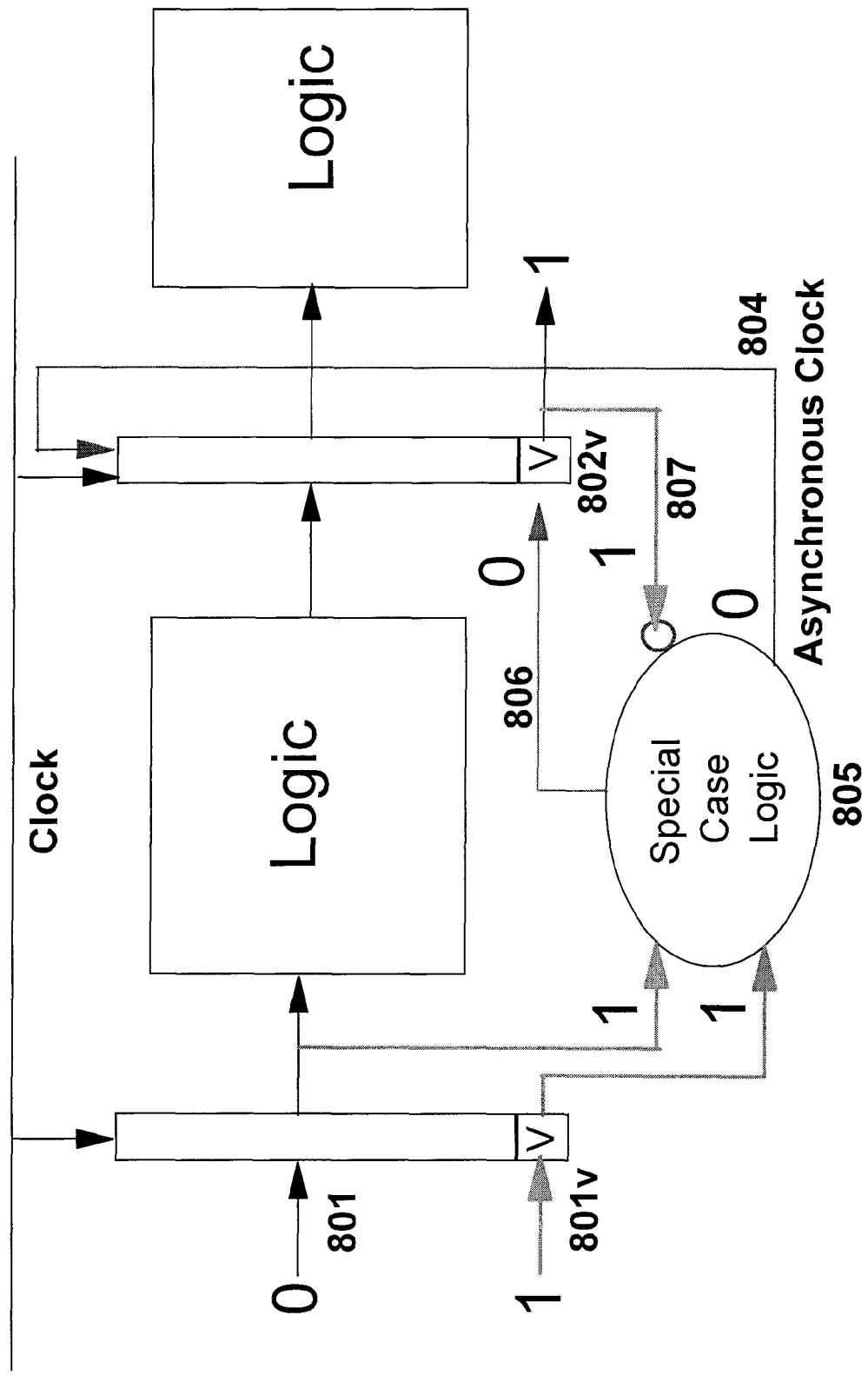
FIG. 8 shows the new logic setting up the pipeline segment for the arrival of the next synchronous clock.

FIG. 8 shows the final "cleanup" that must be done by the Special Case Logic 805 prior to the arrival of the next (synchronous) clock. After the Special Case Logic 805 has "seen" the "Valid" (inverted) input go high 807, and after it has dropped the asynchronous clock output 804 to close the staging latch, it must also drop the "Valid" output signal 806 so that a "0" will be latched into the valid output bit 802v on the next clock cycle. After all, this pipeline segment is now "empty," and now has no output to be operated on.

Thus, in FIG. 8, once the latch has been made nontransparent, the valid input signal to the output latch is dropped, since the following pipeline stage will finish in the current cycle, so the next state of its input is invalid. Care must be taken to ensure that the latch is not transparent prior to lowering this signal so as to avoid a race between this valid bit's input and output.

Note also in FIG. 8, we have another valid input operand that will arrive on the next cycle (denoted by the "1" on the "Valid" input signal 801v that will be latched into the input staging latch when the clock goes high). Note that while the incoming operand data is valid (because the "Valid" bit 801v is a "1"), the "0" on the operand line 801 denotes that this particular (incoming) operand cannot be bypassed by this pipeline segment in the following cycle. We shall see what happens as we proceed to FIG. 9.

Figure 9:
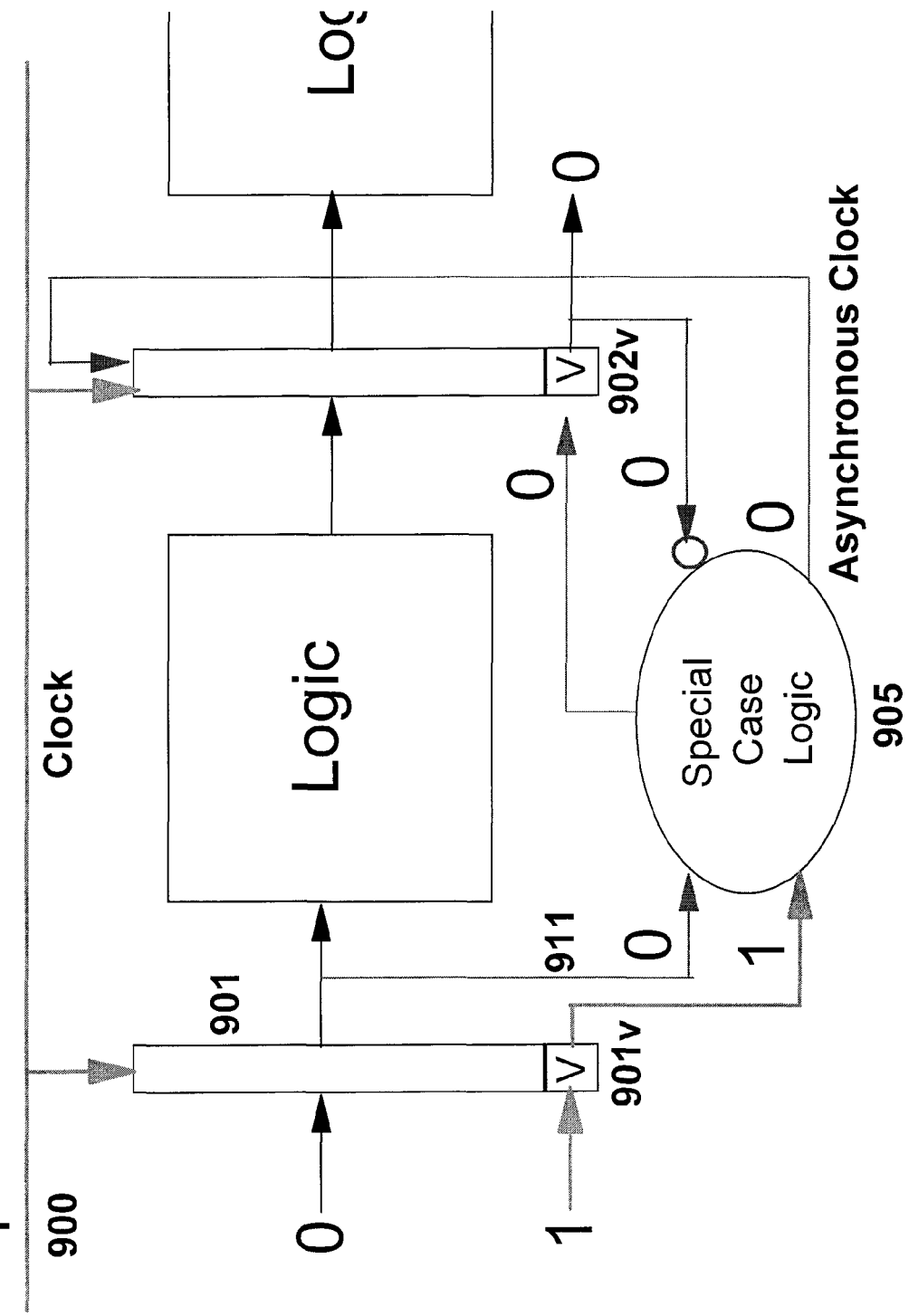
FIG. 9 shows the latching in of a new set of operand data that will not be bypassed.

In FIG. 9, the (synchronous) clock goes high (denoted by the "1" on the clock signal 900). This causes the new input operand(s) and its "Valid" bit to be captured in the input staging latch 901, and 901v, respectively. At the output staging latch, the "Valid" bit 902v captures the value "0," which had been set up in the operation described for FIG. 8.

This pipeline segment will now have work to do on this cycle, and the following pipeline segment will not. Note that since this new operand data cannot be bypassed this time (denoted by the "0" on the input operand line 911), the "Special Case Logic" 905 will not "light up."

Thus, in FIG. 9, the clock gates the new input data into the input latch, and it gates a nonvalid state ("0") into its output latch. The valid single-cycle results of the conjoined stages are captured in the second stage's output latch at this time (outside this figure, well to the right).

Figure 10:
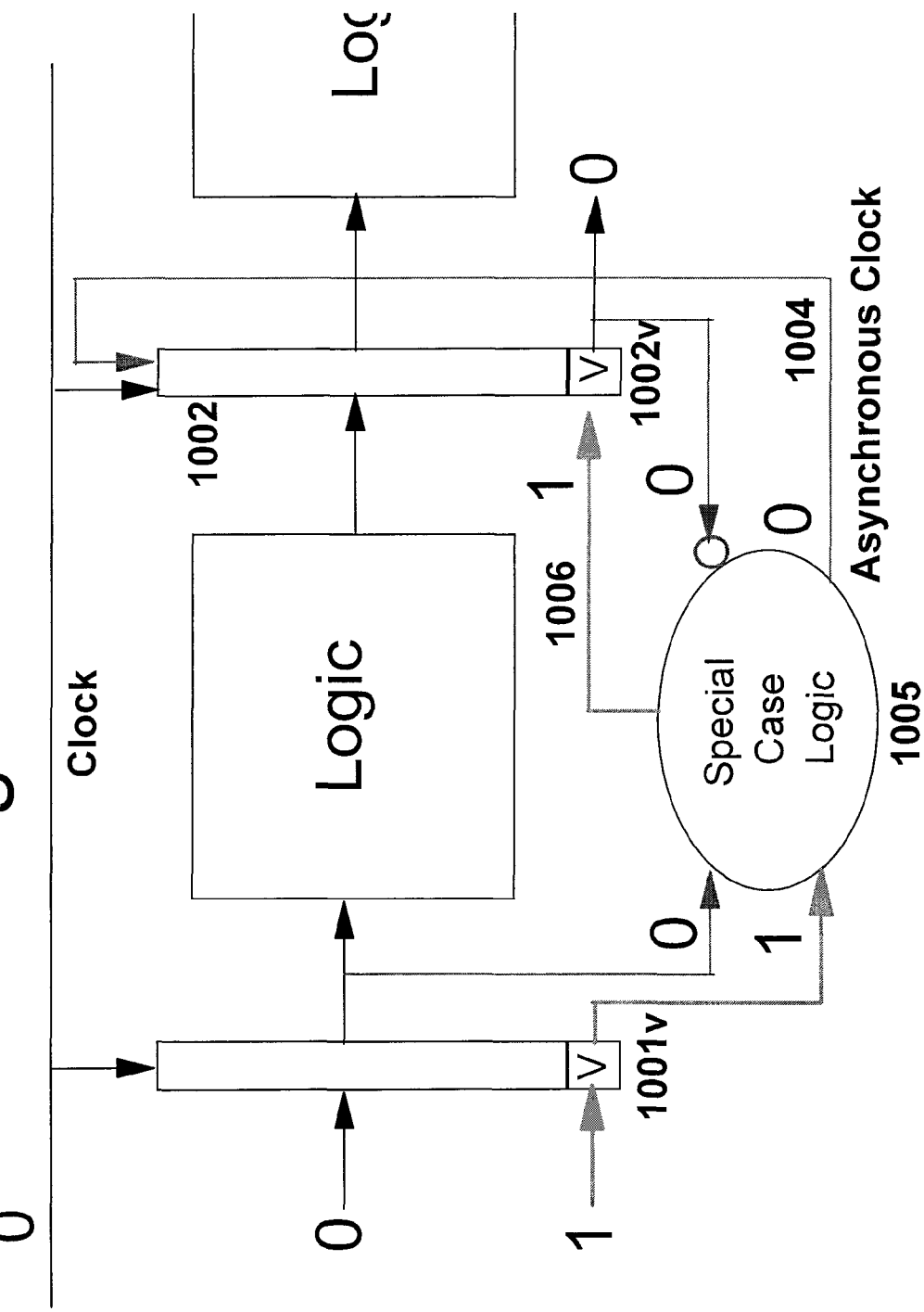
FIG. 10 shows this same logic not performing the bypass operation in this case.

In FIG. 10, we show that the "Special Case Logic" 1005 does not "light up," since the segment cannot be bypassed this time. The "Special Case Logic" leaves the asynchronous clock signal 1004 low, and the output staging latch 1002 is not opened. But the "Valid" bit 1001v is passed through the Special Case Logic to signal 1006, so that a "1" will be latched into the "Valid" bit of the output latch 1002v on the arrival of the next (synchronous) clock. This time, this pipeline segment will have valid output data.

Thus, in FIG. 10, the SCL determines that pipeline shortening is NOT to be done on this cycle, so it merely passes the valid bit input (from the input latch) to the valid bit output (to the output latch). This pipeline stage is back to its nominal operation, and the time sequence ends here.

It is noted at this point that, although the above discussion might suggest that a hardware circuit is implemented as the additional circuitry for the pipeline stage, such is not intended as the only possible mechanism. Thus, for example, the concepts of the present invention could also be implemented as firmware instructions in a controller or ROM controlling the pipeline stages, as well as any other mechanism that permits a pipeline stage to move input data or instructions forward immediately (e.g., without waiting for the system clock's next synchronization pulse) after recognizing that a specific data/instruction is one that permits such skipping by the stage and that processing by the following stage will not be disrupted by such skipping.

Variations on the Exemplary Embodiment

Using Data Tags:

Implicit in the description of the above-discussed exemplary embodiment was the assumption that the "Special Case Logic" examines the input operand(s) to see whether their value(s) are auspicious. That is, the SCL "looks for" values of "all 0" and other things like this. In fact, this has O(log n) complexity, where n is the number of bits in the input operand, and the radix (of the log) is equal to the typical fan-in of a logic gate.

In fact, it may not be desirable to wait this long (O(log n)) to decide to skip a stage. Therefore, in an exemplary alternative embodiment, tags with all operand data can be stored. It is not within the scope of this invention to explain how tags can be stored with operands, but it is well known. These tags can be simply encoded to indicate the various auspicious values that are of interest.

As operands are provided to the pipeline, their tags are sent along with the operand. The "Special Case Logic" can then simply determine the auspicious cases by examining the tags, and not by examining the operands themselves.

Compiler-Generated "Skip Vectors":

In some cases the compiler will be able to determine which segments can be skipped for which kinds of operands. In this case, the compiler can create a "Skip Vector" for each instruction. A "Skip Vector" contains a bit (or a simple encoding of a few bits) for each pipeline segment that declares the situations under which a segment can be skipped.

When an instruction is issued to the pipeline, it is issued with its (compiler generated) "Skip Vector." The "Skip Vector" passes through the pipeline with the instruction, and follows the action encoded for it in each stage by extracting the field within the vector that is relevant to the stage.

In most cases, a field within a "Skip Vector" (which describes the skip conditions for one specific pipeline segment) will describe (in encoded form) the operand conditions under which the associated pipeline stage can be skipped. The Special Case Logic for each stage will process the appropriate field within the "Skip Vector" along with the input operands.

Of course if the input operands also carry tags described in the proceeding section, then the Special Case Logic will apply the "Skip Vector" to the tags. This can result in a very simple and fairly rich set of pipeline flows that can be tailored by the combination of the compiler together with arbitrary tagged object data.

Figure 11:
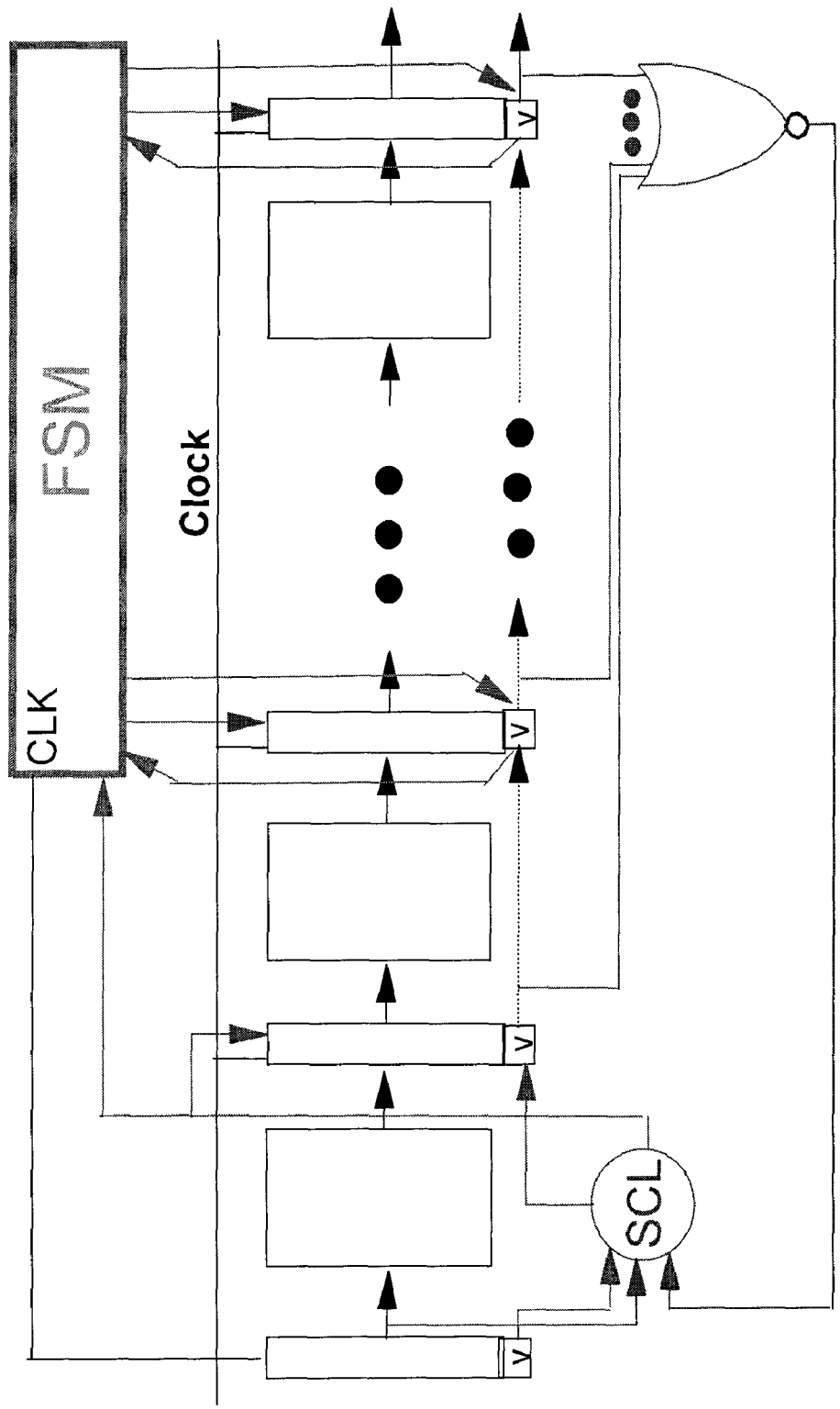
FIG. 11 shows a generalization of the scheme wherein more than one stages of a pipeline are skipped.

Generalization and Skipping Multiple Stages:

FIG. 11 shows that the basic method extends to multiple stages. For the sake of expository, in FIGS. 1-10 we detailed the operation of two stages being concatenated into one cycle. In general, and as shown in FIG. 11, N stages can be concatenated into M cycles, where M<N. (Note that to start the action, we must ensure that the affected stages do not have valid contents. This is the function of the NOR gate.)

Doing this requires a Finite State Machine (FSM) that must do two things:

1. Count to M (at which time the final output latch will contain the correct output), and
2. Ensure the appropriate flow of latch transparency (and re-closing) using (shown here) the valid bits.

What we are doing in essence is removing the latches from the flow temporarily, and allowing the flow through the logic to be a wave—capturing the final output on a synchronous boundary, and returning the latches to their nominal synchronous function after the wave passes.

Achieving the return to synchronicity requires designing the appropriate (analog) delays into the control element (SCL), while counting the synchronous boundaries (clock ticks) within the FSM.

And of course, the method and apparatus of FIG. 11 could be implemented along many non-disjoint subsets of the pipeline, all at the same time, although overlapping subsets should not be in operation concurrently.

While the invention has been described in terms of various exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. An electronic apparatus, comprising:
   a plurality of stages serially interconnected as a pipeline to perform sequential processings on input operands; and
   a shortening circuit respectively associated with each of at least one stage of said pipeline, to recognize one or more of input operands for said stage for which shortening has been predetermined as appropriate and to execute said shortening when appropriate,
   wherein, in each stage having said shortening circuit, data bits of the input operand are presented both to an operational circuit of said stage, for potential processing of the input operand by the operational circuit, and to the shortening circuit, for evaluation whether the input operand will permit shortening of that stage,
   wherein said input operand is precluded from shortening if a processing in a stage immediately following said stage would be disrupted by said passing to said following stage, wherein said input operand comprises a valid bit and said shortening is precluded by monitoring the valid bit of the input operand of said following stage.

2. The electronic apparatus of claim 1, wherein said shortening occurs asynchronously from a system clock controlling said plurality of stages.

3. The electronic apparatus of claim 1, wherein said shortening comprises one of:
   passing said input operand directly to a stage immediately following said stage; and
   conjoining a processing of said input operand by said stage with a processing in said stage immediately following said stage.

4. The electronic apparatus of claim 1, wherein said shortening circuit comprises at least one of:
   a special case logic circuit integrated into said stage; firmware instructions integrated into a controller controlling said electronic apparatus; interaction with data tags; interaction with a compiler-generated skip vector; and stages of a finite state machine.

5. The electronic apparatus of claim 1, wherein each serially interconnected stage of said plurality of serially interconnected stages comprises an output staging latch, said shortening comprising:
   making the output staging latch of said stage temporarily transparent.

6. The electronic apparatus of claim 5, wherein said making said output staging latch temporarily transparent comprises asynchronously opening very briefly said output staging latch for only a time predetermined as sufficient to ensure that all data must have flowed through said output staging latch.

7. The electronic apparatus of claim 6, wherein said shortening comprises one of:
   controlling a bypass switch so that said input operand passes directly to a following stage without a processing by said stage; and
   conjoining a processing of said input operand by processing in both said stage and in said following stage.

8. The electronic apparatus of claim 1, wherein said shortening is recognized as appropriate by at least one of:
   comparing bits of said input operand with bits of input operands predetermined as subject to shortening;
   including a tag in said input operand containing information for shortening; a compiler that provides instructions to be executed by said electronic apparatus; a compiler-generated skip vector issued along with an instruction; and stages of a finite state machine.

9. The electronic apparatus of claim 1, wherein said shortening circuit recognizes which input operands are appropriate for said shortening based on information included in said input operands as a part of a format of said input operands.

10. The electronic apparatus of claim 1, wherein said pipeline comprises more than one stage for which shortening is possible, and each said stage for which shortening is possible comprises a shortening circuit that recognizes said input operands as being appropriate for shortening.

11. A method of shortening a pipeline processing, said method comprising:
   receiving an input operand;
   recognizing, in each stage of said pipeline processing subject to shortening, whether said input operand comprises an input operand predetermined to be subject to shortening, a control signal for said shortening being generated locally by each said stage subject to said shortening, wherein data bits of said input operand are presented to an operational unit in said stage, for a processing of said input operand data bits by that stage's operational unit, and are concurrently presented to a shortening circuit, for an evaluation of said shortening; and
   executing said shortening when appropriate, based on said locally-generated control signal,
   wherein said shortening comprises making temporarily transparent an output latch of a current stage receiving said input operand, in a manner asynchronously from a system clock controlling said pipeline processing.

12. The method of pipeline processing shortening of claim 11, wherein said shortening comprises one of:
   bypassing said input operand directly to a following stage; and
   conjoining a processing of said input operand by two stages such that a processing in a current stage is followed by a processing in said following stage as executed in a same clock cycle.

13. The method of pipeline processing shortening of claim 11, wherein said shortening is precluded if it would be disruptive to a processing in a following stage.

14. The method of pipeline processing shortening of claim 11, as implemented by one of:
   a special case logic circuit integrated into at least one stage of said pipeline; firmware instructions integrated into a controller controlling said pipeline; a compiler providing instructions to be executed by said pipeline; data tags; a compiler-generated skip-vector; and stages of a finite state machine.

15. A pipeline processing shortening circuit associated with a stage of a pipeline comprising a plurality of stages serially interconnected to perform sequential processings on input operands, said shortening circuit comprising:

a receiver for receiving an input operand for said stage; a comparator for recognizing whether said input operand comprises an input operand predetermined to be subject to shortening; and a controller for executing said shortening when recognized as appropriate, wherein data bits of said input operand are presented to an operational unit in said stage, for a processing of said input operand data bits by that stage's operational unit, and are concurrently presented to said shortening circuit, for an evaluation of said shortening, wherein said controller executes said shortening by asynchronously opening an output latch of said stage of said pipeline and wherein said shortening comprises one of:

said controller switching said input operand to pass directly to a following stage; and said input operand is thereby conjoined to said following stage such that said input operand is processed by both said stage and said following stage in a same clock cycle.

16. The pipeline processing shortening circuit of claim 15, wherein said shortening is precluded if it would be disruptive to a processing in a following stage.

17. The pipeline processing shortening circuit of claim 15, wherein said controller temporarily makes transparent an output latch of a current stage receiving said input operand, in a manner asynchronously from a system clock controlling said pipeline processing.

18. The pipeline processing shortening circuit of claim 15, as implemented by one of:

a special case logic circuit integrated into at least one stage of said pipeline;

firmware instructions integrated into a controller controlling said pipeline;

a compiler providing instructions to be executed by said pipeline;

data tags;

a compiler-generated skip-vector; and stages of a finite state machine.

\* \* \* \* \*